(12) United States Patent
Kotrla et al.

(10) Patent No.: US 7,962,806 B2
(45) Date of Patent: Jun. 14, 2011

(54) METHOD AND SYSTEM FOR PROVIDING BIT ERROR RATE CHARACTERIZATION

(75) Inventors: Scott R. Kotrla, Wylie, TX (US);
Christopher N. DelRegno, Rowlett, TX (US); Michael U. Bencheck, Richardson, TX (US); Matthew W. Turlington, Richdardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 12/250,587

(22) Filed: Oct. 14, 2008

(65) Prior Publication Data
US 2010/0095167 A1    Apr. 15, 2010

(51) Int. Cl.
*G06F 11/00* (2006.01)
*G01R 31/28* (2006.01)

(52) U.S. Cl. ........................................ 714/704; 714/712
(58) Field of Classification Search .................. 714/704, 714/776, 738, 739, 712, 47, 48, 56, 43, 41, 714/39, 4, 705, 708, 821, 728; 370/248, 370/250, 242; 375/354
See application file for complete search history.

(56) References Cited

U.S. PATENT DOCUMENTS

| | | | | |
|---|---|---|---|---|
| 4,347,600 A * | 8/1982 | Abbott et al. | ................. | 370/225 |
| 4,376,999 A * | 3/1983 | Abbott et al. | ................. | 370/217 |
| 4,710,924 A * | 12/1987 | Chum | ............... | 714/25 |
| 6,094,737 A * | 7/2000 | Fukasawa | ..................... | 714/738 |
| 6,550,029 B1 * | 4/2003 | Bailey et al. | .................. | 714/724 |
| 7,079,612 B2 * | 7/2006 | Tarng | ............... | 375/354 |
| 7,624,323 B2 * | 11/2009 | Casillas et al. | ................ | 714/738 |

* cited by examiner

*Primary Examiner* — Phung M Chung

(57) ABSTRACT

An approach is provided for bit error rate characterization. A test signal representing one or more Ethernet frames exhibiting a particular bit error rate is generated. The test signal is output to a device under test. Traffic is received from the device under test. A determination is made as to whether a link failure condition exists at a port on an Ethernet switch.

20 Claims, 4 Drawing Sheets

METHOD AND SYSTEM FOR PROVIDING BIT ERROR RATE CHARACTERIZATION

BACKGROUND INFORMATION

Modern communication networks are growing in size and complexity. Given the highly competitive nature of the telecommunications industry, network service providers are increasingly relying on network performance as a key differentiator for delivering communication services. As the number of consumers increases and services evolve in sophistication, the performance of these networks can degrade, in part, from constraints of the network equipment. In many instances, the impact of network failures or even lapses in network performance can result in substantial monetary losses. Consequently, the ability to assess and improve upon network performance is a critical business component for service providers. Unfortunately, it is difficult to determine the types of errors that can negatively impact a network element and its associated networking technology (e.g., Ethernet). This is particularly challenging when the communication system encompasses a variety of domains (e.g., optical and electrical).

Therefore, there is a need for an approach that provides for error characterization within other networking domains.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing bit error rate characterization are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to frame-based networks, such as Ethernet networks, it is contemplated that various exemplary embodiments are also applicable to other equivalent transport environments and technologies.

Figure 1:
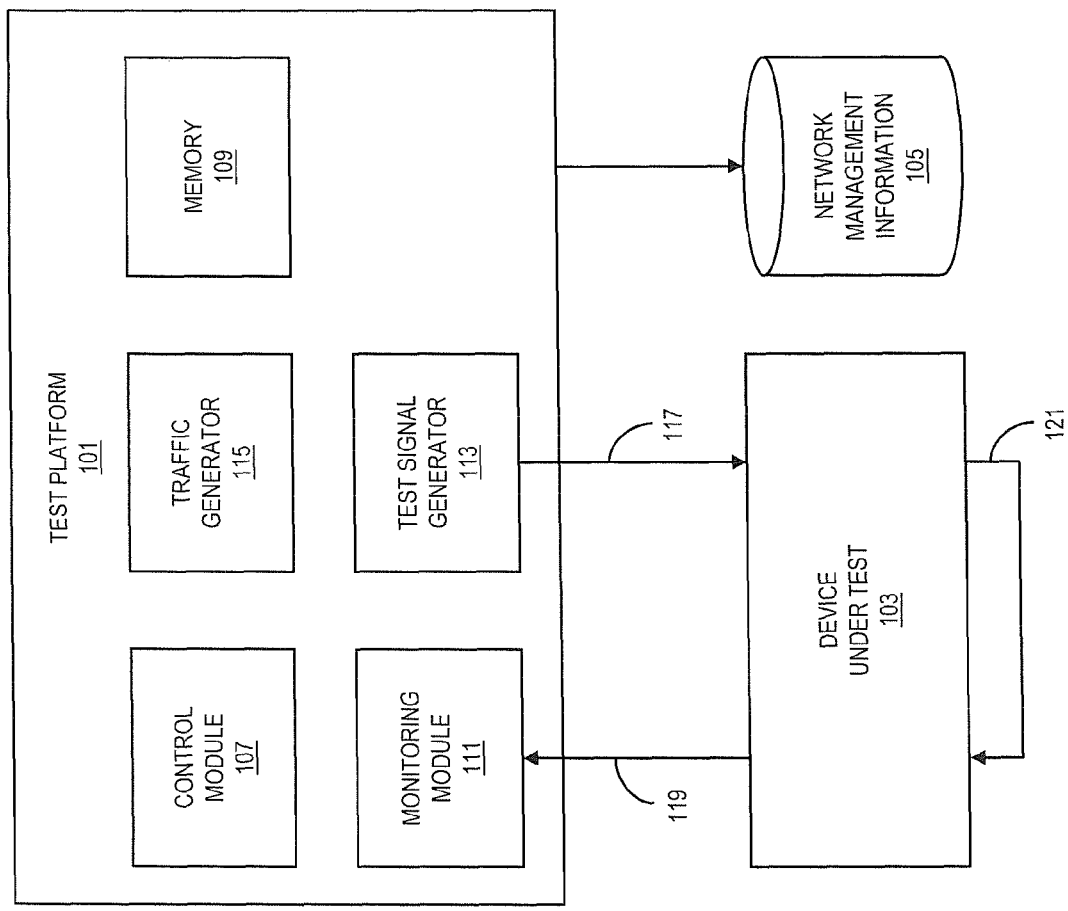
FIG. 1 is a diagram of a system for providing bit error rate characterization, according to an exemplary embodiment.

FIG. 1 is a diagram of a system for providing bit error rate characterization, according to an exemplary embodiment. For the purposes of illustration, system 100 is described with respect to test platform 101 configured to determine the physical layer performance of one or more devices under test (DUT) (e.g., DUT 103) based on the ability of the DUTs to handle one or more bit error rates (BER) or BER profiles. It is noted that DUT 103 may be any suitable networking node or combination of networking nodes and, thereby, may additionally (or alternatively) represent a network under test (NUT), system under test (SUT), or other like environment under test. It is contemplated that system 100 may embody many forms and include multiple and/or alternative components and facilities.

One way in which the performance of a device can be assessed is by testing a link supported by the device for a physical BER, which is typically defined as a ratio between a total number of errors that occur during transmission or reception of a given number of bits of information and the total number of bits of information transmitted or received. By obtaining the BER and comparing it to a predetermined threshold value, network nodes can engage in, for example, one or more actions, such as triggering alarms, modifying rates at which bits of information are transmitted or received, or engaging in other suitable actions. For instance, communication links within synchronous optical networking (SONET) or synchronous digital hierarchy (SDH) domains can be provisioned to respond to excessive BERs by switching link operating states to, for example, a signal degradation state or signal failure state. In turn, these state definitions enable SONET/SDH infrastructures (and particularly the nodes of these infrastructures) to automatically reroute network traffic, modify one or more transmission or reception rates, employ alternative (or additional) communication media, and/or take other like actions that can ultimately increase network resiliency, minimize the loss of transmitted or received information, and reduce time-consuming rerouting procedures. Unfortunately, such capabilities have been traditionally limited to the SONET/SDH domains.

For SONET/SDH chipsets, a BER is measured utilizing various bits (or bit streams) transmitted in the overhead, i.e., extra connection bandwidth allocated by a service provider to signal, time, and manage network traffic. In this manner, SONET/SDH links (or ports) are capable of provisioning into a signal degrade state or a signal failure state based on BER measurements. Other networking chipsets, such as Ethernet chipsets, however, have not traditionally implemented state information beyond binary up/down states of connections. That is, a connection within an Ethernet domain is either available for transport of network traffic (i.e., a binary up or active state) or not available for use (i.e., a binary down or disabled state). As such, the health (or signal degradation) of Ethernet connections cannot be monitored and, therefore, such health information is not available for engaging in network performance optimization. Furthermore, Ethernet chipsets do not consistently respond to bit errors and, therefore, a wide range of error rates can potentially exist that can potentially create failure conditions.

Therefore, the approach of system 100, according to certain embodiments, stems from the recognition that by enabling service providers to be able to characterize device performance in terms of one or more BERs will allow these service providers to test the effectiveness of proposed methods to improve networking performance, as well as manage and optimize such network performance. In particular, the approach of system 100, according to certain embodiments, recognizes that enabling BER characterization of Ethernet devices and networks will allow service providers to certify and manage Ethernet transport and services.

According to various exemplary embodiments, test platform 101 is configured to generate and output (e.g., transmit) one or more test signals including one or more BERs (or BER profiles) for characterizing one or more DUTs, such as DUT 103. That is, test platform 101 can be utilized to evaluate the operational performance of, for example, DUT 103 in response to at least one BER (or stressed condition). The operational performance may relate to a hardware performance, software performance, or effective hardware/software performance of DUT 103 or one or more components of DUT 103. For instance, to evaluate the networking capabilities of an Ethernet chipset of DUT 103 under various stressed networking conditions, test platform 101 may generate and transmit various bit errors to DUT 103 in accordance with one or more BERs. These BERs may be predetermined and, thereby, drawn from a storage location or may be dynamically generated based on one or more control signals provided by, for instance, a network administrator and/or based on BER information stored to, for example, the storage location.

According to various exemplary embodiments, the test signal may represent one or more transmitted units of data, such as one or more blocks, cells, frames, packets, etc., exhibiting a particular BER (or BER profile). As such, test signals may include network traffic (whether actual or simulated) injected with a predetermined (or known) number errors (e.g., bit errors) before and/or during transmission to DUT 103. Depending on the characteristics of DUT 103, e.g., a hardware and/or software configuration, test platform 101 can monitor for a change in a link (or channel) status, e.g., failure condition, between test platform 101 and DUT 103. Monitoring may be performed according to one or more signals, e.g., return traffic, received by a port of test platform 101 from DUT 103 in response to the test signal being outputted to DUT 103. In certain instances, monitoring may be facilitated through auto-negotiation procedures conducted between test platform 101 and DUT 103 via the link or another link established between test platform 101 and DUT 103. Based on one or more monitored link statuses, test platform 101 can learn (or otherwise determine) networking conditions, e.g., network traffic conditions, that the Ethernet chipset and, thereby, DUT 103 are suitable to support. In exemplary embodiments, test platform 101 may also generate network management information for governing the provisioning of DUT 103 in a transport network based on the evaluation. This network management information may also be utilized to provision service or conduct network performance optimization (e.g., selecting networking nodes, links, transmission rates, etc., to support, for example, a service level agreement or improve upon such configurations) or execute failure recovery measures (e.g., rerouting network traffic to links and nodes suitable to support the network traffic in the event of link or node failures). Accordingly, network management information may be stored to repository 105 and/or any other suitable location, memory, or storage facility of system 100.

By way of example, test platform 101 may comprise computing hardware (such as described with respect to FIG. 4) to execute the processes described herein. According to one implementation, test platform 101 includes control module 107, memory 109, monitoring module 111, test signal generator 113, and traffic generator 115. In certain embodiments, test platform 101 may communicate with one or more repositories, such as network management information repository 105. Further, test platform 101 can be configured to interface with at least one DUT (e.g., DUT 103) via one or more links (or channels), such as links 117 and 119, which may include both physical connections and/or logical connections that may, in certain embodiments, extend over one or more communication networks, e.g., local area networks (LAN), metropolitan area networks (MAN), wide area networks (WAN), etc. It is noted that communication between test platform 101 and DUT 103 may be enabled or facilitated by loopback 121. It is contemplated, however, that test platform 101 may embody many forms and include multiple and/or alternative components or configurations. For example, it is contemplated that one or more components of test platform 101 may be combined, located in separate structures, or separate physical locations. In other words, a specific topology is not critical to embodiments of test platform 101 or system 100 for that matter.

In exemplary embodiments, control module 107 controls the operation of monitoring module 111, test signal generator 113, and traffic generator 115 according to one or more programs and/or information stored to memory 109. Memory 109 may represent a hierarchy of memory, which may include both random access memory (RAM) and read-only memory (ROM). Computer instructions, such as control logic, network traffic generation instructions, test signal generation instructions, link transmission instructions, link monitoring instructions, and testing instructions can be stored in non-volatile memory, such as erasable programmable read-only memory (EPROM), electrically erasable programmable read-only memory (EEPROM), and/or flash memory; however, may be stored in other type or form of storage. Memory 109 may further store program information, such as one or more BERs, BER profiles, actual or simulated network traffic, DUT capabilities, and transmission capabilities of test platform 101. According to exemplary embodiments, computer instructions and/or program information may be locally or remotely input to memory 109, such as by a network administrator over a communication network, as well as preloaded to memory 109 during a manufacturing process. As such, control module 107 and/or memory 109 may receive one or more user inputs for locally or remotely controlling one or more functions of test platform 101, which may be facilitated by a user interface, such as a graphical user interface (GUI), portal application, etc., implemented by or interfaced with test platform 101. In any event, system software, specific device applications, program instructions, program information, user inputs, or parts thereof, may be temporarily loaded to control module 107 and/or memory 109, such as to a volatile storage device, e.g., RAM. Accordingly, memory 109 may be implemented as one or more discrete devices, stacked devices, or integrated with control module 107. It is also contemplated that memory 109 may include a removable module so that computer instructions and/or program information may be provided to test platform 101 by substituting one or more memory components.

Test signal generator 113 generates and outputs at least one test signal including one or more BERs (or BER profiles) to DUT 103 based on information from control module 107 and/or memory 109. That is, test signal generator 113 provides configurable signal oscillation for outputting at least one test signal representing one or more transmitted units of data exhibiting a particular BER to DUT 103. In this manner, the test signal may be characterized by and, thereby, customized to exhibit any suitable frequency, modulation, period, voltage, waveform, or other suitable signaling parameter. Test signal generator 113 may provide test signals exhibiting a constant number of bit errors over a given time period or may generate unique BER profiles, such as periodic or Poisson error distributions of, for example, inverse bit errors, pseudo random bit sequences (PRBS), or any other suitable BER or BER profile. According to various embodiments, test signal generator 113 may overlay generated test signals with BERs. For instance, one or more transmitted units of data may be generated over a particular coding (e.g., 8 B/10 B coding mapping 8-bit symbols to 10-bit symbols) with bit errors introduced into the particular coding. It is contemplated that any suitable coding (or combination of codes) may utilized, such as any suitable channel coding, line coding, source coding, etc. Furthermore, it is contemplated that test signal generator 113 may provide test signal trialing, e.g., outputting a same test signal and/or different test signals, multiple times.

In certain embodiments, test signal generator 113 may additionally (or alternatively) inject impairments (or errors) into network traffic before and/or during output to DUT 103, wherein such network traffic can serve as the test signal or a portion of a test signal. The network traffic may be "actual" network traffic copied (or otherwise taken) from a transport network or may be pseudo-network traffic generated by, for instance, traffic generator 115. Traffic generator 115 can randomly generate or specifically generate flows of information (i.e., traffic) according to information from control module 107 and/or memory 109. In this manner, a flow of information may be predetermined or dynamically configured to corresponding to varying types or forms of "real-world" networking conditions, such as network traffic corresponding to data, voice, and/or video transport over one or more public and/or private networks, e.g., one or more LANs, MANs, WANs, etc. Thus, test signal generator 113 may stress DUT 103 under various conditions and testing scenarios.

Monitoring module 111 may receive information, such as performance information, from DUT 103 in response to at least one test signal exhibiting a particular BER being output to DUT 103. As such, monitoring module 111 may also evaluate this performance information and provide one or more results to, for example, control module 107 and/or test signal generator 113. The performance information and/or results can be utilized by test platform 101 to characterize how DUT 103 would perform in response to "real-world" conditions at least comparable to those stress conditions and testing scenarios applied to DUT 103. For instance, the performance information may relate to a link status of, for example, link 117. The status may relate to an active state (e.g., link 117 is trouble-free, i.e., no failure condition detected) or a disabled state (e.g., link 117 is troubled, i.e., a failure condition is detected). In exemplary embodiments, monitoring may be performed over any suitable time interval, which may be predetermined and/or configured by, for example, a network administrator. For instance, a configurable time interval may be established for monitoring DUT 103 over several seconds, minutes, hours, etc.

According to one embodiment, monitoring module 111 may be implemented by (or itself implement) any suitable terminating device, such as a bridge, hub, modem, switch, etc., or any suitable terminal device, such as a handset, personal computer, router, server, workstation, etc., capable of operation under one or more physical layer standards defining the relationship between one or more communication ports (not illustrated) of monitoring module 111 and one or more physical communication mediums interfacing with these communication ports, e.g., link 119. It is contemplated that monitoring module 111 may additionally (or alternatively) interface with and, thereby, monitor link 117, as will become more apparent below. As such, monitoring module 111 may include any suitable number of communication ports for monitoring any suitable number of links and, thereby, any suitable number of DUTs. In one embodiment, communication ports of monitoring module 111 are governed by one or more Ethernet standards, which define a family of connection and signaling standards for the physical layer (i.e., through means of the media access control sub-layer of the data link layer), as well as a common addressing format for the exchange of information over various communication mediums. The 802.3 collection of Institute of Electrical and Electronics Engineers (IEEE) standards define and standardize the physical layer, as well as the media access control sub-layer of the data link layer, for wired Ethernet, all of which are incorporated herein, by reference, in their entireties. Thus, the one or more physical connections (e.g., links 117 and 119) between test platform 101 and DUT 103 may be provided by way of suitable copper cabling or optical fiber cabling that supports Ethernet. It is noted, however, that various exemplary embodiments of system 100 are equally applicable to other communication mediums, whether wired or wireless, as well as other physical layer (or higher layer) standards.

When operating under one or more Ethernet standards, control module 107, monitoring module 111, and test signal generator 113 may implement one or more auto-negotiation procedures. Auto-negotiation, in exemplary embodiments, facilitates automated testing of DUT 103, such as facilitating automated monitoring of one or more links established between test platform 101 and DUT 103, e.g., links 117 and 119. More specifically, by implementing auto-negotiation between test platform 101 and DUT 103, monitoring module 111 can be provided with remote fault information that may be utilized as a signaling mechanism to indicate a link failure condition on, for example, link 117. According to certain embodiments, DUT 103 may signal a link failure condition to monitoring module 111 via one or more link pulses, link pulse bursts, or other suitable signaling. It is noted that auto-negotiation may achieved between test platform 101 and DUT 103 without test platform 101 having to otherwise externally communicate with DUT 103.

Accordingly, the exchange of these link pulses, link pulse bursts, or other suitable signaling, can be utilized by monitoring module 111 to detect the presence of active or disabled links between test platform 101 and DUT 103. In this manner, monitoring module 111 may implement or utilize one or more configurable timers (not shown), such as a configurable hold-up timer and a configurable hold-down timer, for testing DUT 103 and monitoring the status of one or more links (e.g., link 117) as the link(s) come in and out of active or disabled states. For example, the hold-up timer may provide a hold-up time that serves as a waiting period for test signal generator 113, such as a waiting period before test signal generator 113 may provision a test signal on link 117. Namely, the hold-up time may be instituted after link 117 (in an active state) is detected (or otherwise determined) as disabled, but before link 117 is determined as capable of accepting a test signal from test signal generator 113. As such, link 117 may transition to (or remain in) a disabled state during the hold-up time, such that if a test signal is received by link 117 from test signal generator 113, link 117 can prevent the test signal from being transmitted to DUT 103 during the hold-up time. The hold-up time may also enable link 117 to be brought into an active state, but can prevent test signals from being transmitted by link 117 until the hold-up time has elapsed. In particular instances, if the hold-up time has elapsed, monitoring module 111 may provide information to DUT 103, control module 107, and/or test signal generator 113 indicating that the hold-up time has elapsed. As such, the expiration of the hold-up time may be utilized by monitoring module 111 to detect time intervals over which link 117 is disabled. For instance, by establishing a relatively short hold-up time, monitoring module 111 can detect relatively short time intervals over which link 117 is considered disabled. Thus, by controlling the hold-up time, the sensitivity of monitoring module 111 may be configured. It is noted that the hold-up timer may additionally (or alternatively) provide for a configurable hold-up time range.

Accordingly, the hold-up timer may be initialized by monitoring module 111 through the exchange of signaling, e.g., link pulses, link pulse bursts, etc., with DUT 103 that indicate link 117 is troubled, such as receiving suitable signaling via link 119 that indicates link 117 exhibits a link failure condition. Such signaling may be utilized when loopback 121 is implemented via hardware, e.g., when a receiving channel (or port) and a transmitting channel (or port) of DUT 103 are hardwired (or otherwise interfaced) to provision a "round-trip" path between test platform 101 and DUT 103 via links 117 and 119. It is noted, however, that loopback 121 may be implemented via software that enables a receiving channel and a transmitting channel to be established over a same link, e.g., link 117. It is noted, however, that when loopback 121 is implemented via software, monitoring module 111 may determine a link failure condition from a failure to receive suitable signaling from DUT 103 via link 117. Thus, the exchange of suitable signals between test platform 101 and DUT 103 may be exchanged via link 117, such that monitoring module 111 need only monitor link 117. This may be additionally (or alternatively) utilized when loopback 121 is implemented via hardware.

The hold-down timer may provide a hold-down time that can serve as waiting period for monitoring module 111, such as a waiting period before monitoring module 111 signals a disabled link state to control module 107 and/or test signal generator 113. That is, the hold-down time may be instituted when link 117 (in an active state) enters (or is otherwise detected as in) a troubled-state, such as when the hold-up timer is initiated. In this manner, there may be situations when link 117 transitions from a disabled state to an active state during the hold-up time. If link 117 makes such a transition during the hold-up time, but before the expiration of the hold-down time, monitoring module 111 may utilize such an event to exclude the temporal disabled state during the hold-down time as a "true" link failure condition. Thus, by controlling the hold-down time, the sensitivity of monitoring module 111 can be tempered, such that monitoring module 111 may not signal a disabled state to control module 107 and/or test signal generator 113 until the expiration of the hold-down time. It is noted that the hold-down timer may additionally (or alternatively) provide for a configurable hold-down time range.

In exemplary embodiments, control module 107 and/or monitoring module 111 can characterize the operational performance of DUT 103 based on one or more monitored link statuses of link 117 in response to one or more stressed conditions and testing scenarios. For instance, monitoring module 111 may ascertain various networking characteristics of DUT 103, such as one or more throughput values, burst values, frame-loss values, latency values, or other suitable parameters, by analyzing which stress conditions (e.g., BERs, BER profiles, etc.) bring about failure conditions on link 117. Test platform 101 may store networking characteristics to one or more system 100 storage locations, such as network management information repository 105, memory 109, or a memory (not shown) of DUT 103. Accordingly, DUT 103 may utilize this network management information when DUT 103 is provisioned as part of a transport network of a service provider. For instance, the networking characteristics may be utilized when routing (or rerouting) network traffic, reserving bandwidth under a service level agreement, optimizing network performance, etc. It is also contemplated that the networking characteristics may be utilized by a network administrator or network management system for provisioning service to a customer or certifying hardware or software installations.

It is also contemplated that, in certain embodiments, auto-negotiation procedures may be utilized by test platform 101 and DUT 103 to exchange technological capabilities, such as one or more duplex modes, transmission rates, transmission standards, etc., via one or more signals, e.g., one or more link pulses, link pulse bursts, or other signaling. By exchanging this information, test platform 101 may learn the operative mode(s) of DUT 103 and, thereby, determine one or more test scenarios for characterizing one or more of the operative modes of DUT 103. Control module 107 may toggle through one or more of these test scenarios based on, for example, control information stored to memory 109 or user input provided to control module 107 or memory 109 by, for instance, a network administrator.

Figure 2:
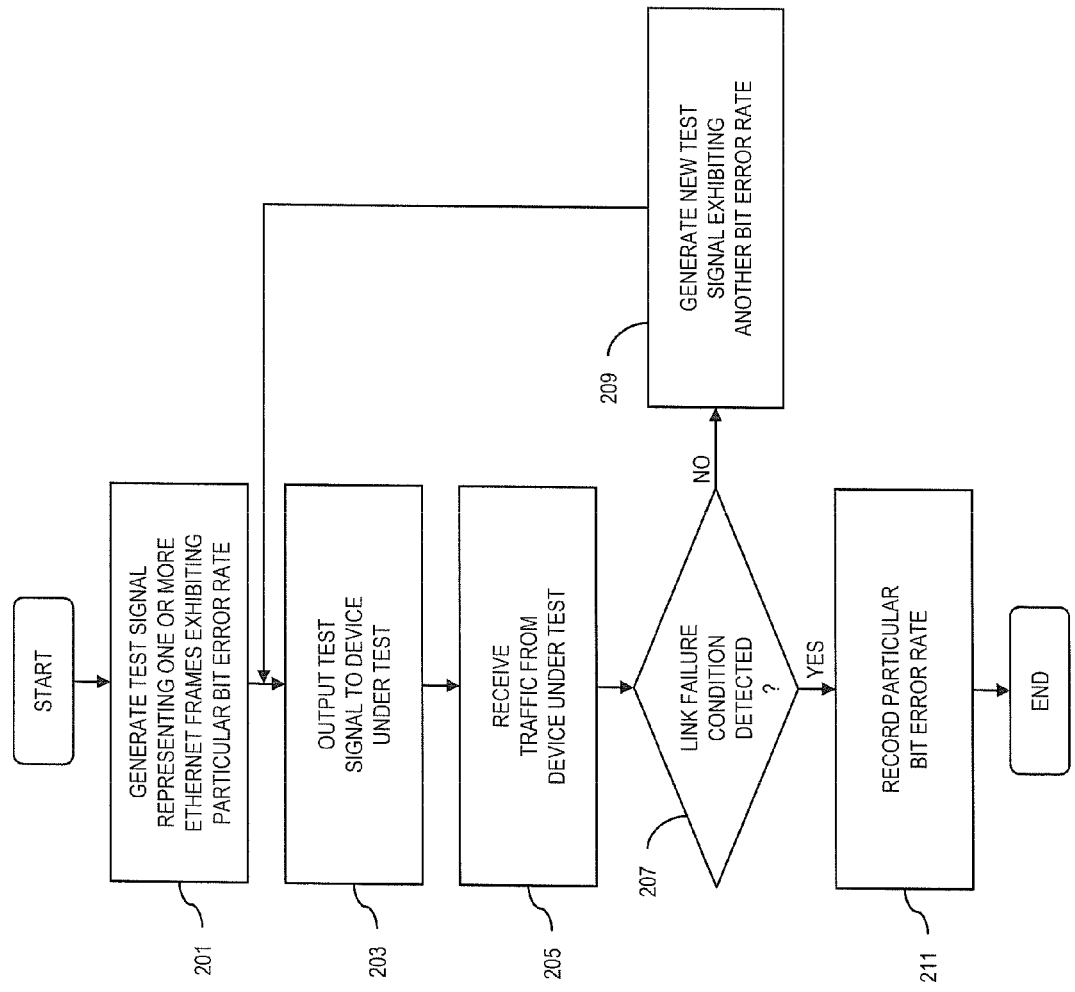
FIGS. 2 and 3 are flowcharts of processes for providing bit error rate (BER) characterization, according to exemplary embodiments.
Figure 3:
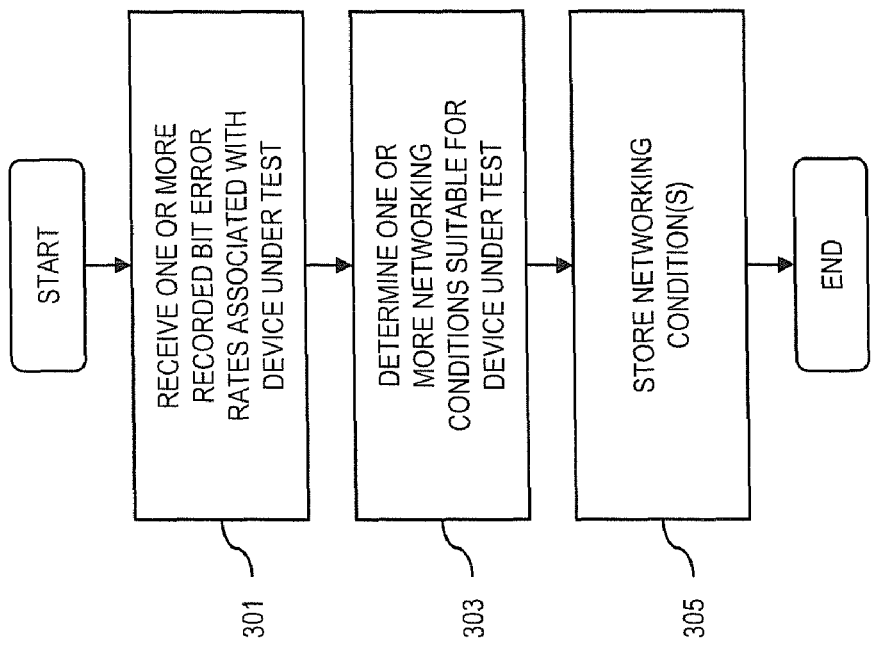

FIGS. 2 and 3 are flowcharts of processes for providing bit error rate characterization, according to exemplary embodiments. For illustrative purposes, the processes are described with reference to FIG. 1. It is noted that the steps of the processes may be performed in any suitable order, as well as combined or separated in any suitable manner.

In particular, FIG. 2 is a flowchart of an exemplary process for determining one or more BERs that cause DUT 103 to drop link 117. At step 201, test platform 101 (via test signal generator 113) generates a test signal representing one or more units of data (e.g., Ethernet frames) exhibiting a particular BER. For example, test signal generator 113 may generate a test signal exhibiting a constant number of bit errors over a given time period or may generate unique BER profiles, such as periodic or Poisson error distributions of, for example, inverse bit errors, pseudo random bit sequences (PRBS), or any other suitable BER. Additionally (or alternatively) test signal generator may inject impairments (or errors) into network traffic, wherein such network traffic can serve as a generated test signal or a portion of a generated test signal. In step 203, the test signal is output to DUT 103 via link 117, such as by transmitting the test signal over one or more communication networks. It is noted that injecting impairments or errors into the network traffic may occur before or during transmission to DUT 103. Per step 205, test platform 101 receives traffic from DUT 103 in response to the test signal being output to DUT 103. It is noted that this traffic may include signaling for testing DUT 103 and monitoring a status of link 117. In this manner, test platform 101 (via monitoring module 111) determines, per step 207, whether a link failure condition exists on link 11 7, such as in one or more of the aforementioned manners. If no failure condition is detected, then control module 107 and/or monitoring module 111 may signal test signal generator 113 to generate (in step 209) a new test signal exhibiting another BER, such that the process reverts to step 203. If a failure condition is detected, then control module 107 and/or monitoring module 111 records the particular BER to, for example, a system 100 storage location, such as repository 105, memory 109, etc. While not illustrated, additional testing trials may be performed.

FIG. 3 is a flowchart of a process for generating network management information, according to an exemplary embodiment. At step 301, control module 107 may receive one or more recorded BERs associated with DUT 103 from, for example, memory 109. Based on these BERs, control module 107 may determine one or more networking conditions suitable for DUT 103. Namely, control module 107 may characterize DUT 103 with one or more networking characteristics, such as one or more throughput values, burst values, frame-loss values, latency values, or other suitable parameters, by analyzing which stress conditions (e.g., BERs, BER profiles, etc.) bring about failure conditions on link 117. Thus, in step 305, control module 107 stores these networking conditions to network management information repository 105, or other suitable storage location of system 100, such as memory 109, a memory of DUT 103, etc. As previously mentioned, DUT 103 may utilize this network management information when DUT 103 is provisioned as part of a transport network of a service provider. For instance, the networking characteristics may be utilized when routing (or rerouting) network traffic, reserving bandwidth under a service level agreement, optimizing network performance, etc. It is also contemplated that the networking characteristics may be utilized by a network administrator or network management system for provisioning service to a customer or certifying hardware or software installations.

The processes described herein for providing BER characterization may be implemented in software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 4:
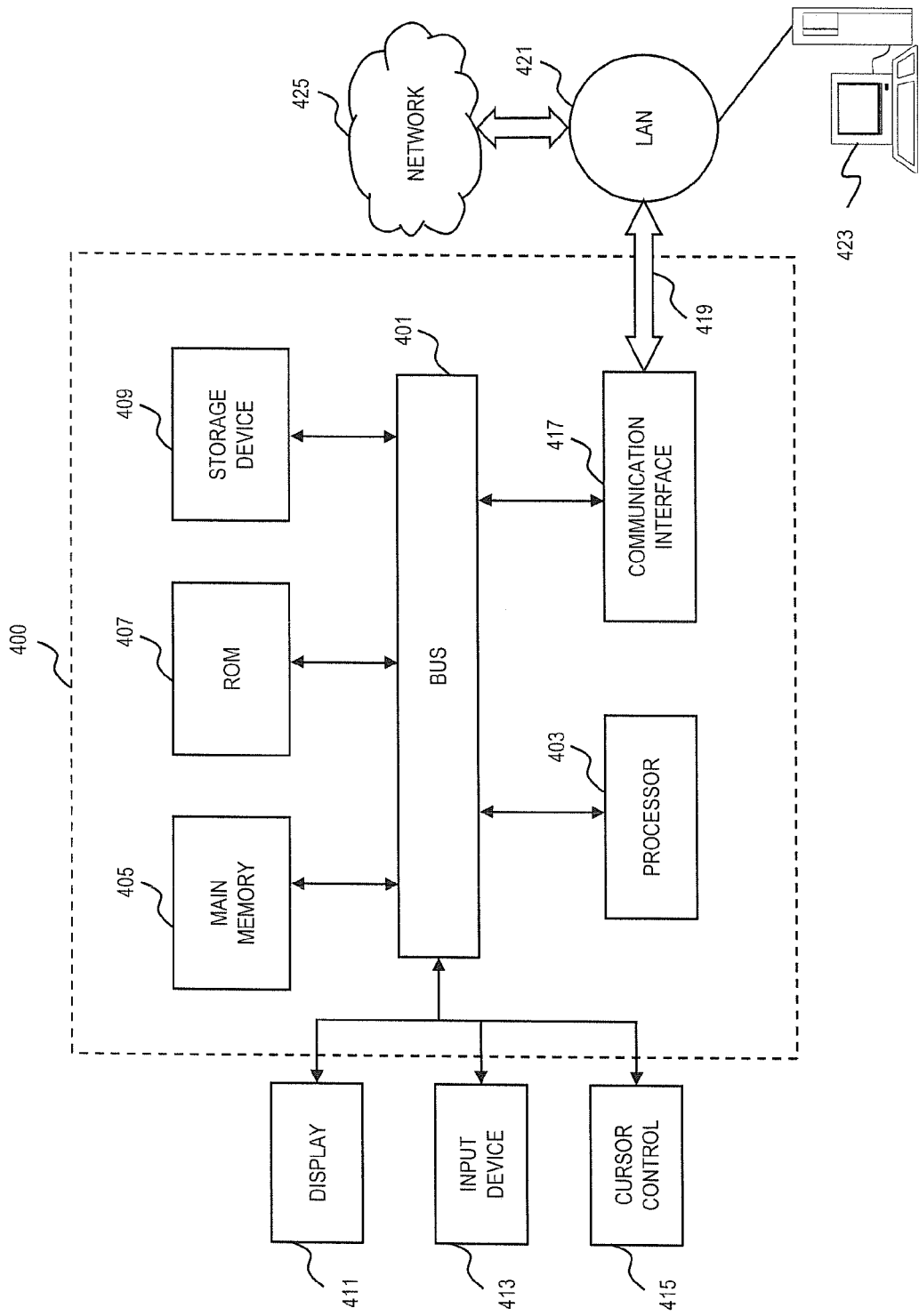
FIG. 4 is a diagram of a computer system that can be used to implement various exemplary embodiments.

FIG. 4 illustrates computing hardware (e.g., computer system) 400 upon which an embodiment according to the invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to an embodiment of the invention, the processes described herein are performed by the computer system 400, in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the invention. Thus, embodiments of the invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    generating one or more test signals, each representing one or more Ethernet frames exhibiting a particular bit error rate;
    transmitting the one or more test signals to a device under test over a link to an Ethernet port on the device under test;
    receiving data from the device under test;
    determining whether a link failure condition exists on the link for each of the one or more test signals; and
    determining networking characteristics for the device under test based on the bit error rate for each of the one or more test signals that resulted in the link failure condition.

2. The method according to claim 1, wherein the particular bit error rate, for each of the one or more test signals, includes inverse bit errors or pseudo random bit error sequences.

3. The method according to claim 1, wherein each of the one or more test signals at least includes network traffic injected with a predetermined number of errors.

4. The method according to claim 1, wherein the device under test is a networking node or combination of networking nodes.

5. The method according to claim 1, wherein the data, received from the device under test, includes one or more signals indicating an operational state of the Ethernet port.

6. The method according to claim 1, wherein the step of determining includes monitoring over a predetermined time period for the link failure condition on the link.

7. A non-transitory computer-readable storage medium carrying one or more sequences of one or more instructions which, when executed by one or more processors, cause the one or more processors to perform the method of claim 1.

8. The method according to claim 1, wherein the networking characteristics comprise one or more of throughput values, burst values, frame-loss values, and latency values.

9. The method according to claim 1, wherein the device under test is provisioned in a transport network, and the networking characteristics are utilized for one or more of routing or rerouting network traffic, reserving bandwidth under a service level agreement, optimizing network performance, provisioning service to a customer, and certifying hardware or software installations.

10. An apparatus comprising:
    a test signal generator configured to generate one or more test signals, each representing one or more Ethernet frames exhibiting a particular bit error rate, and to transmitting the one or more test signals to a device under test over a link to an Ethernet port on the device under test; and
    a monitoring module configured to receive data from the device under test, and to determine whether a link failure condition exists on the link for each of the one or more test signals,
    wherein the bit error rate for each of the one or more test signals that resulted in the link failure condition is utilized to determine networking characteristics for the device under test.

11. The apparatus according to claim 10, wherein the particular bit error rate, for each of the one or more test signals, includes inverse bit errors or pseudo random bit error sequences.

12. The apparatus according to claim 10, wherein each of the one or more test signals at least includes network traffic injected with a predetermined number of errors.

13. The apparatus according to claim 10, wherein the device under test is a networking node or combination of networking nodes.

14. The apparatus according to claim 10, wherein the data, received from the device under test, includes one or more signals indicating an operational state of the Ethernet port.

15. The apparatus according to claim 10, wherein the monitoring module is further configured to monitor over a predetermined time period for the link failure condition on the link.

16. The apparatus according to claim 10, wherein the networking characteristics comprise one or more of throughput values, burst values, frame-loss values, and latency values.

17. The apparatus according to claim 10, wherein the device under test is provisioned in a transport network, and the networking characteristics are utilized for one or more of routing or rerouting network traffic, reserving bandwidth under a service level agreement, optimizing network performance, provisioning service to a customer, and certifying hardware or software installations.

18. A method comprising:
    generating Ethernet traffic exhibiting physical layer bit errors; and
    forwarding the Ethernet traffic to an Ethernet port of a device under test;
    determining a link error condition corresponding to the forwarded Ethernet traffic; and
    determining networking characteristics for the device under test based on information about the link error condition and the physical layer bit errors.

19. The method according to claim 18, wherein the device under test is a networking node or combination of networking nodes.

20. The method according to claim 18, wherein the Ethernet traffic includes one or more signals indicating an operational state of the Ethernet port.

* * * * *